June 13, 1933.  J. B. MARSHALL  1,913,765
ROTATABLE ORNAMENT
Filed Dec. 26, 1929
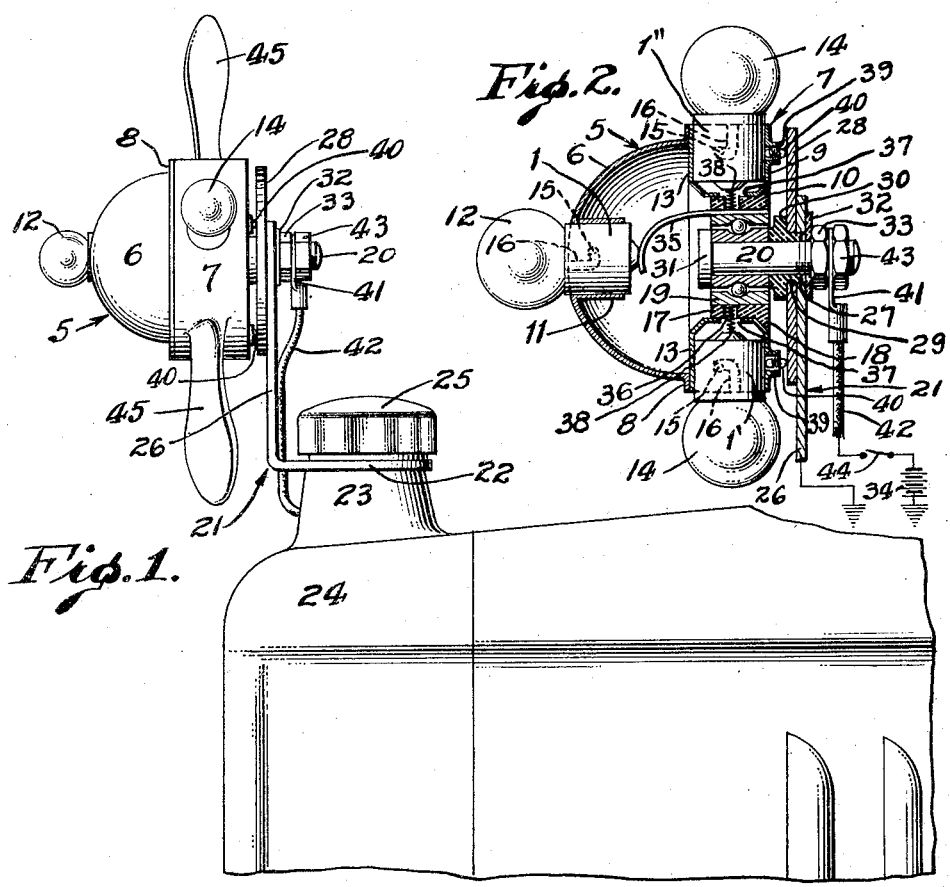
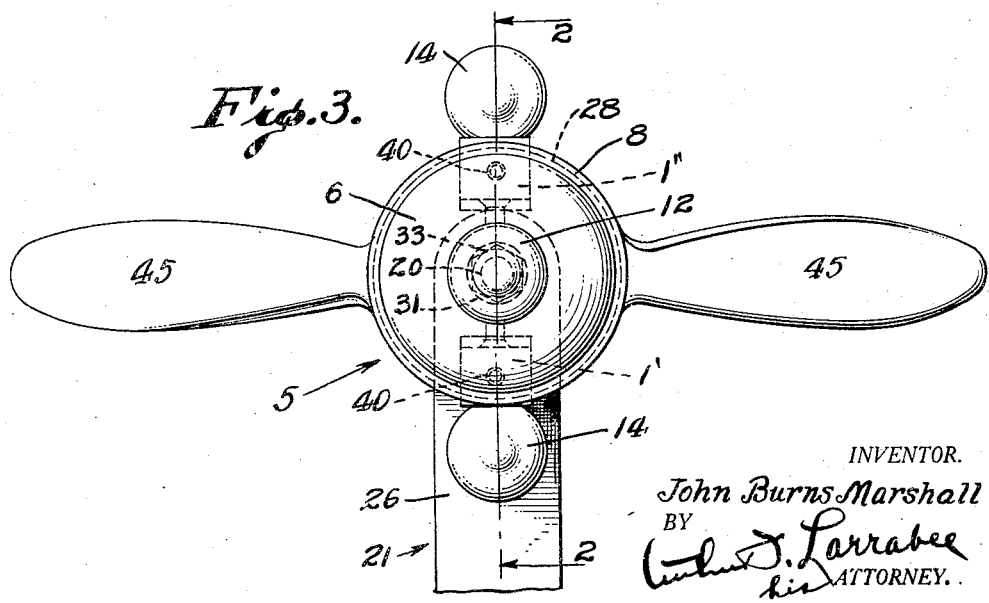
INVENTOR.
John Burns Marshall
BY
his ATTORNEY.

Patented June 13, 1933

1,913,765

UNITED STATES PATENT OFFICE

JOHN BURNS MARSHALL, OF LOS ANGELES, CALIFORNIA

ROTATABLE ORNAMENT

Application filed December 26, 1929. Serial No. 416,731.

My invention relates to ornaments, particularly to such ornaments as are adapted to be affixed to automobiles or other vehicles.

An object of the invention is to construct and arrange an ornament so that it is adapted to be rotated by movement through a fluid or by a fluid in motion, and is attachable to a suitable part of a structure or vehicle, as, for instance, the radiator of an automobile, and to provide the ornament with suitably arranged electrical illuminating elements of selected colors so that the ornament may be connected with a suitable source of electric energy, such as the battery of the automobile, in order that the color combinations of the illuminating elements may be of a pleasing appearance and thus may give pleasure to the persons that see the ornament in operation.

Another object of the invention is to provide a rotatable ornament of the aforementioned character with anti-friction bearings so that the ornament may be rotated even by a comparatively weak fluid current.

A further object of the invention is to provide novel contacts and insulations for the electrical illuminating elements in a rotatable ornament of the aforementioned character in order to prevent short-circuiting and also to reduce the friction at the contact points of the rotatable ornament with the stationary contacts therefor.

Other objects, advantages, and features of invention may appear from the accompanying drawing, the subjoined detailed description and the appended claims.

The accompanying drawing illustrates the invention in a form I at present deem preferable.

Figure 1 is a side elevation of the rotatable ornament of my invention, as applied to the radiator of an automobile, of which only the upper front portion is shown.

Fig. 2 is a section taken on a plane indicated by line 2—2, Fig. 3, the circuit for the electrical illuminating elements being illustrated more or less diagrammatically.

Fig. 3 is a front elevation of the rotatable ornament and its securing bracket, of which only the upper portion is shown.

The preferred form of the ornament of my invention is indicated in a general way by the numeral 5. This ornament is shown as including a front member or housing 6, made out of metal or other suitable material and preferably being semi-spherical in shape, and a rear member 7, which preferably is cylindrically formed and if desired may be integral with the front member or otherwise connected therewith. For instance, the front member 6 may be provided with a peripheral annular flange 8, fitting the front end of the rear member 7 and being secured to the latter by any suitable means, such as by being welded or brazed thereto, or by screws or rivets, not shown.

The rear member 7 is formed with a rear wall 9, which is open at its center and has there formed a seat portion 10, and the front member 6 has co-axial therewith an interior tubular extension 11, forming in the front portion of the member 6, a socket for the reception of the tang 1 of an illuminating element or lamp 12. In the cylindrical wall of the rear member 7 are also inward extensions 13 which form sockets for the reception of the respective tangs 1', 1'' of other illuminating elements or lamps 14. The lamps 12 and 14 may be of any approved type, each of which has on said tangs a pin 15, (see Fig. 2) while each of the extensions 11 and 13 is shown as having a bayonet slot 16 for the reception of the pin 15 in order that the lamps may be easily secured or attached to, or removed from, their respective sockets.

An annular member 17 of a suitable insulating material, for instance, fiber or bakelite, fits tightly in the central opening of the rear member 7 and may be provided with a shoulder 18 that fits the seat portion 10. The insulating member also tightly fits the outer race of a ball bearing 19, the inner race of which is mounted upon a shaft 20.

As a means for securing or supporting the shaft 20 to, or from, a vehicle, a suitable bracket 21 is provided. This bracket may, as shown in Fig. 1, have an arm 22 which fits on the tubular stem 23 on top of the radiator 24 of an automobile and is secured to the stem by any suitable means, as the radiator cap 25. The bracket 21 has an upstanding arm 26 which is shown as having in its end portion an opening 27 which is of a considerably larger diameter than the shaft 20.

Formed either integral with the arm 26, or as a separate part, is a disc-like plate or member 28 which has therein a central opening of a diameter preferably corresponding to the diameter of the opening 27. An annular insulating bushing 29 fits on the shaft 20 and extends through the openings in the member 28 and the arm 26 and has formed thereon a flange or shoulder portion 30 adapted to lie close to the surface of the member 28 and to space the ball bearing 19 from plate 28, and said flange is cut back on its inner surface so that the inner end portion of the bushing will contact only the inner race of the ball bearing at its inner end and thereby allow clearance for the outer race to freely rotate. The shaft 20 has formed thereon a head 31, while the outer end portion of the shaft is threaded and has thereon an insulating washer 32 that separates and insulates nut 33 from member 28. When the nut 33 is screwed tightly against the washer 32, the inner race of the ball bearing is held tightly between the head 31 and the inner end of the bushing 29, while the shoulder 30 of the latter is pressed firmly against the member 28. The shaft and the inner race of the ball bearing are in this manner held stationary relative to the supporting means therefor, and the shaft serves as a pivot or stub shaft around which the ornament 5 is freely rotatable.

By resilient means, held in any suitable manner within the rear member 7 of the ornament 5, the lamps 12 and 14 are adapted to be connected in circuit with a source of electric energy, as, for instance, a battery 34, shown diagrammatically in Fig. 2. A flat spring 35 is preferably fixed with one end portion between the insulating member 17 and the outer race of the ball bearing 19 and has its other end portion bent and extended so as to resiliently contact the usual contact tip at the end of the tang of the lamp 12. The insulating member 17 is formed with small openings 36, which respectively register with openings 37 of somewhat large diameter at the inner ends of the extensions 13. The contact tips of the respective lamps 14 are adapted to respectively hold coiled springs 38 in openings 36, 37 so that the contact tip of each lamp 14 is resiliently connected or contacted either by the flat spring 35 or the outer race of the ball bearing 19. The front and rear members 6, 7 are electrically grounded with the plate 28 by any suitable means, such as the spring-and-ball device 40 reciprocatively mounted in openings 39 in the rear wall 9 of member 7. Each device 40 acts as a contact-making brush which resiliently presses against the disc member 28 and against the side of the tang for its respective lamp 14.

A contact terminal 41 of a wire 42 is placed upon the shaft 20 outside of the nut 33 and is firmly held against the latter and connected to shaft 20 by a nut 43, and the other end of the wire 42 is suitably connected with one pole of the battery 34, while the battery is suitably grounded at its other pole, as shown diagrammatically in Fig. 2. Preferably, a switch 44 is interposed at some portion in the circuit, for instance, in the wire 42.

In order to cause rotation of the ornament 5 either when the ornament is moved through the air or when a current of air is directed against it, the ornament may be provided with propeller blades 45, which are preferably arranged laterally on the rear member 7 of the ornament and diametrically opposite each other between lamps 14. These blades are shown as being two in number, but the number and the arrangement of the blades are suggested only for the purpose of illustration, and it should be understood that I do not restrict my invention to the number or the arrangement of the blades as shown.

It being assumed that the ornament 5 is connected on top of the radiator 24 of an automobile, as before described, and that the switch 44 is closed, as shown in full lines in Fig. 2, the current will flow from the battery 34 through the wire 42, the switch 44, the shaft 20, the ball bearing 19, the springs 35 and 38, the respective lamps 12 and 14, the walls of the front and rear members 6 and 7, the spring-and-ball devices 40, the disc member 28, the bracket 21 and back to the battery, through the ground connection thereof, thus causing illumination of the lamps 12 and 14.

It also being assumed that the automobile is moving or that otherwise, a current of air is caused to strike the propeller blades 45 so as to rotate the ornament 5, the lamp 12, which is in the center of the wall of the front member 6, and axially arranged relative to shaft 20, will appear as if it were virtually stationary, while the rotation of the peripherally arranged lamps 14 will cause them to appear as rings of light, thus making a pleasing impression upon the persons that see the ornament in operation.

Although it is suggested that a lamp of white color be used as an illuminating element in connection with the socket in the inward extension 11 and that blue and red lamps be used in connection with the sockets in the respective extensions 13, it is evident that any other color or color combination of lamps may be selected. The number and the arrangement of the inward extensions 11 and 13, as well as of the lamps, as shown, may also be changed in order to produce many other pleasing optical effects.

I claim:

1. An ornament comprising a housing; means to rotatably mount said housing on a supporting structure; a plurality of electrical illuminating elements which are mounted upon said housing and extend radially beyond the peripheral portion thereof; means for connecting said illuminating elements with a single source of electric energy during rotation of said housing; a plurality of propeller elements carried by said housing and projecting radially therefrom, a portion of said housing projecting forwardly of the plane in which said propelling elements rotate; an electric lamp located on said projecting portion of the housing in the axis of rotation thereof; and a conducting spring which rotates with said housing and is in continuous engagement with the base of said lamp to supply illuminating current thereto, said spring being electrically connected with the conductors of the circuit which supplies the first recited illuminating elements.

2. An ornament comprising a housing; a shaft upon which said housing is rotatably supported; means adapted to support said shaft upon a vehicle with one end of said shaft projecting forwardly with relation to the vehicle; a housing rotatably mounted upon said shaft, a portion of said housing projecting beyond the forward end of said shaft, there being an insulation provided between said housing and said shaft; wind-operable propelling elements mounted upon said housing to rotate the same; an electric lamp mounted upon the projecting portion of said housing substantially in the axis of rotation thereof, said lamp being in a position to throw light upon said wind-operable propelling elements; a leaf spring having a shank portion which rotates with said housing eccentrically of the axis of rotation thereof and an end portion which is deflected and which constantly engages the base portion of said lamp; and means to supply electric current to said spring during the rotation of said housing continuously to energize said lamp.

3. An ornament comprising a housing; electrical illuminating elements mounted on said housing; means to rotatably support said housing, comprising a supporting arm, a shaft connected to and insulated from said arm, an anti-friction bearing secured on said shaft, an insulating bushing on said bearing and supporting said housing; means electrically connecting said illuminating elements with said shaft; a conducting disk concentric to said shaft and which is in circuit with said arm; electric brush devices engaging said disc continuously during the rotation of the housing; and means whereby a source of electric energy is connected to said shaft and said arm to illuminate said elements.

In testimony whereof, I have hereunto set my hand at Los Angeles, California, this 14th day of December, 1929.

JOHN BURNS MARSHALL.